United States Patent [19]

Assmann

[11] 4,295,034
[45] Oct. 13, 1981

[54] HOT AIR GRILL

[75] Inventor: Jurgen Assmann, Michelbach, Fed. Rep. of Germany

[73] Assignee: Grossag GmbH, Fed. Rep. of Germany

[21] Appl. No.: 966,571

[22] Filed: Dec. 5, 1978

[30] Foreign Application Priority Data

Dec. 6, 1977 [DE] Fed. Rep. of Germany ....... 2754208

[51] Int. Cl.$^3$ .......................... A37J 37/00; A21B 1/22
[52] U.S. Cl. .................................. 219/400; 126/21 A; 99/447; 219/386
[58] Field of Search ........................ 219/400, 385–387; 126/21 A, 9 R, 9 B, 281; 99/447, 474, 476; 34/196

[56] References Cited

U.S. PATENT DOCUMENTS

| | | | |
|---|---|---|---|
| 2,641,679 | 6/1953 | Brodbeck | 219/370 |
| 2,896,606 | 7/1959 | Ross et al. | 126/9 B |
| 3,611,912 | 10/1971 | Choc | 126/9 R |
| 3,656,469 | 4/1972 | Jung et al. | 126/21 A |
| 4,108,141 | 8/1978 | Bauer | 126/9 R |
| 4,120,237 | 10/1978 | Mecherlen | 126/9 R |
| 4,171,478 | 10/1979 | Naykki | 219/400 |

FOREIGN PATENT DOCUMENTS

| | | |
|---|---|---|
| 2409292 | 9/1975 | Fed. Rep. of Germany . |
| 2412835 | 9/1975 | Fed. Rep. of Germany . |
| 2422632 | 12/1975 | Fed. Rep. of Germany ........ 99/447 |
| 2555522 | 6/1977 | Fed. Rep. of Germany . |
| 2606942 | 8/1977 | Fed. Rep. of Germany ........ 99/447 |
| 2615604 | 10/1977 | Fed. Rep. of Germany ... 126/21 A |

1133431 11/1968 United Kingdom ................ 219/348

*Primary Examiner*—E. A. Goldberg
*Assistant Examiner*—Bernard Roskoski
*Attorney, Agent, or Firm*—Robert E. Burns; Emmanuel J. Lobato; Bruce L. Adams

[57] ABSTRACT

A hot air grill comprises a base having a vertical portion and a horizontal portion, which are hingedly connected with one another. A transparent casing for food to be cooked sits on the horizontal base portion and has an opening in one side to receive a heating assembly mounted on the vertical base portion. The casing comprises two deeply dished like halves which are assembled one over the other with the upper half inverted and a metal joining strip between their edges. Each casing half has in one side a semicircular opening which together form a circular opening to receive the heating assembly. The heating assembly comprises a radial type fan on the shaft of a motor mounted in the vertical base portion, a heating coil surrounding the fan and a cover having a central opening through which air is drawn in from the casing and then discharged from the periphery of the fan back into the casing after passing over the heating coil. A cooling fan on the motor shaft inboard of the heating assembly fan is partitioned from the heating assembly and serves to keep the vertical base portion and motor cool. With the casing removed, the horizontal base portion folds up against the vertical base portion so as to cover the heating assembly. The folded-up base is so compact that it can be put inside the casing for storage or transport.

25 Claims, 9 Drawing Figures

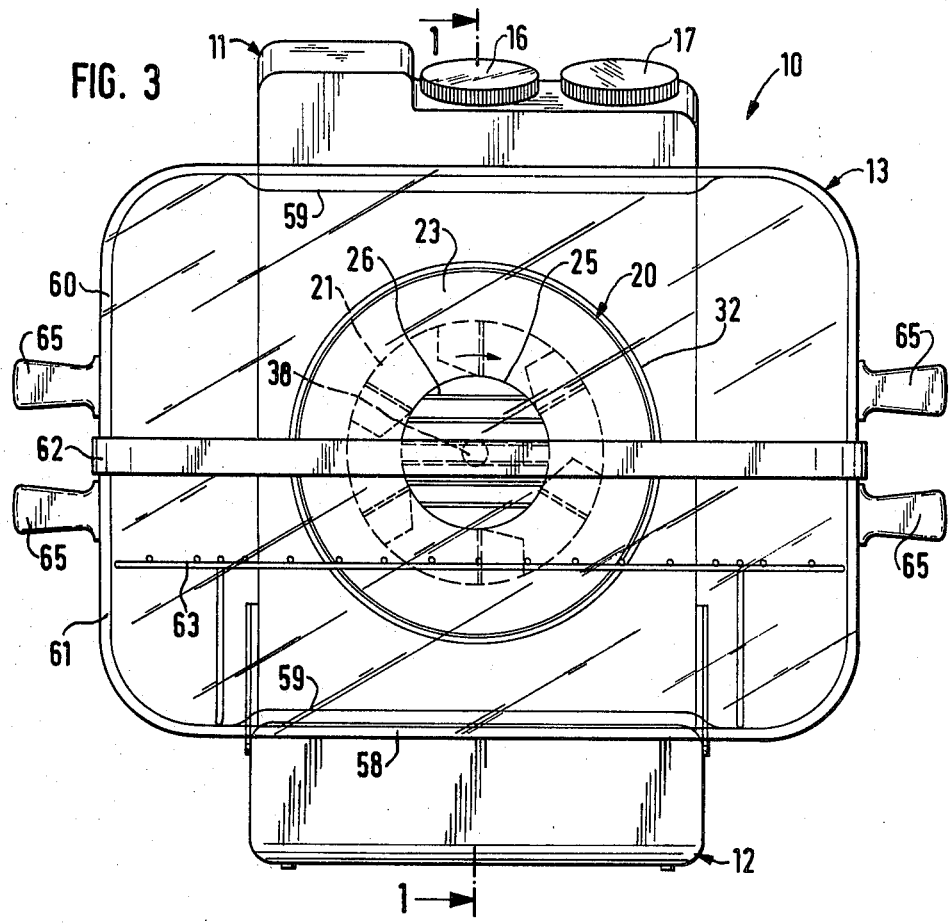
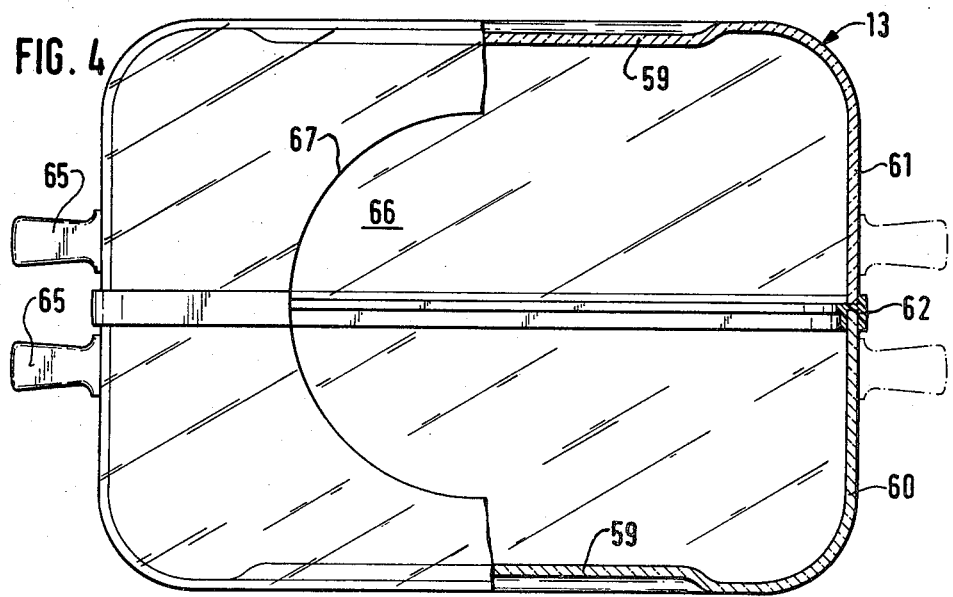

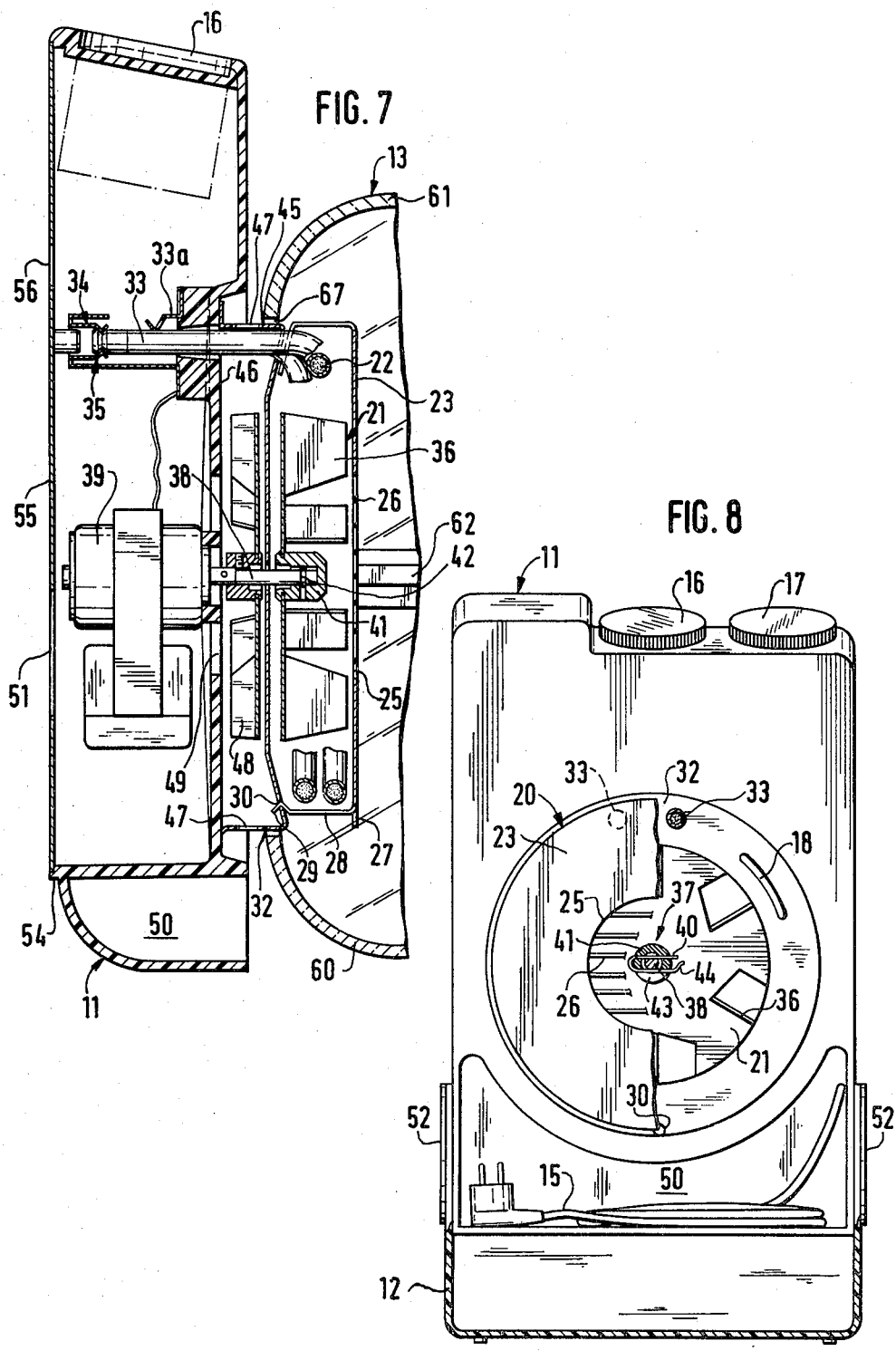

HOT AIR GRILL

FIELD OF INVENTION

The present invention relates to a hot air grill comprising a base containing electrical connection, switching control and drive means, an air heating assembly mounted on the base and comprising a heating element and fan and a grill chamber casing which is removably mountable on the base.

BACKGROUND OF THE INVENTION

In contrast to the conventional radiant heat grill, hot air grill apparatus works with hot air circulation whereby the air present in the grill chamber is heated and circulate around the roast or bake goods by the hot air assembly. The food-stuff that is to be roasted, cooked, baked or grilled no longer needs to be turned and receives better, faster and more uniformly from all sides the heat necessary for roasting.

German published specification No. 25 55 522 discloses a container provided with a closure and adapted to receive food-stuff for thermal treatment by means of a hot air assembly inserted in an opening in the bottom of the container. The vertically arranged bottom of the container is removably mounted by screws on a vertical arm of an essentially L-shaped stand. The arm is fixed to a horizontal foot which extends under the fan motor and control part. The container has a removable front door which is also vertical. The container, door and adjustable height grating are removable and easily cleaned, for example in a dishwasher. The hot air assembly, on which grease and other constituents of the food being cooked may deposit by reason of the recirculation of air, is not removable and can be cleaned only with difficulty as the electric drive and control parts of the apparatus cannot be immersed in water. Layers of grease and the like deposited on the surface of the heating elements reduce the efficiency of heat conduction and thereby lengthen the grilling and roasting process. Moreover, the accummulation of grease and other deposits on the fan and all other parts of the hot air aggregate is unhygenic and unsightly. The overall dimensions of the apparatus in relation of the capacity of the grill chamber are relatively great so that the apparatus occupies a large amount of room on the kitchen table or in the cupboard and is bulky to transport. Moverover, it cannot be mounted on a wall but must stand on a table.

German published specification No. 24 12 835 discloses a hot air roasting apparatus for household use in which a motor with a fan heating element, switching and control elements are mounted on the cover of a downwardly opening hat-shaped insulating container. This hat-shaped container is set on top of a bowl containing gratings on which the food-stuff is placed. Also with this apparatus the parts of the hot air assembly can be cleaned only with difficulty. The motor stands high above the cover on which it is mounted. The bowl for the food-stuff to be heated must be placed on a heat-proof surface because it has no insulation or legs. This apparatus likewise cannot be mounted on a wall but must sit on a table. The hot air assembly obscures direct view of the food so that control of its condition is difficult.

German published specification No. 24 09 370 discloses a closable container for the thermal treatment of food-stuff. The container comprising a tank part and a cover part is tiltably arranged on a foot support. An air heating and circulating device is mounted in a side wall of the container in a manner not described. The side has no opening large enough for passage of the air heating assembly which is thus not removable. With the use of wholly identical half shells which are open at one side and leave free an opening for insertion and removal of food, a cover is necessary. Also this apparatus is not of optimal form for cleaning, is insecure in the mounting and cannot be mounted on a wall. For the accommodation of foot and heating aggregate parts, these must be disassembled in a large number of small parts and put loose in the shell.

German published specification No. 24 09 292 discloses a hot air assembly for cooking food in an enclosure such as a roasting oven. The assembly consists of two groups of which one is inside the enclosure and the other is mounted outside the enclosure. The group which is outside the enclosure comprises a motor and control elements. The group that is inside the enclosure comprises a dish-shaped reflector provided with a cover and housing, a heating element and a fan which is mounted on the motor shaft which extends through the enclosure wall and through the central portion of the reflector. The fan can be removed from the shaft by unscrewing a retaining nut and the group inside the enclosure can be dismounted for cleaning, for example in a dishwashing machine. When the cover of the reflector is removed, there is the danger of injury of fingers by the fan in case the motor runs. Safety means are not provided and could be installed only with difficulty. The apparatus is not suitable for mounting on a base. It provides for heating food in a fixed enclosure such as a roasting over rather than in a removable receptacle.

SUMMARY OF THE INVENTION

It is a primary object of the invention to avoid the above-mentioned disadvantages while simultaneously retaining advantages of known hot air grill apparatus and to improve the design characteristics of such apparatus especially with regard to cleaning, assembly, support and convenience of use.

The invention is directed to the problem of further improving in many technical respects hot air grill apparatus with good heating and roasting characteristics to achieve a hot air grill having important advantages over those presently available.

In accordance with the invention, there is provided a hot air grill comprising a horizontal base portion and a vertical base portion hingedly connected with one another, an electric motor mounted on the vertical base portion having a horizontal shaft, a heating assembly comprising a heater fan mounted on the motor shaft and an electric heating element in position to heat air blown by the fan and a casing for receiving food-stuff to be cooked, the casing being at least partly transparent, having at one side an opening to receive the heating assembly and being supported by resting on the horizontal base portion. The horizontal base portion and the casing have interfitting portions for positioning the casing in predetermined position to receive the heating assembly in said opening.

A further feature of the invention is that a cooling fan is mounted on the motor shaft between the heater fan and the motor and a partition is provided between the cooling fan and heater fan so that air circulated by the cooling fan protects the motor and other components in the base from the heat of the heating assembly.

Moreover, in accordance with the invention, all parts which are subjected to vapors of the food being grilled and hence subject to deposit of grease and other food derivatives can be easily cleaned so as to maintain sanitary conditions and the efficiency of the heating unit.

DESCRIPTION OF THE INVENTION

In accordance with the invention there is provided a hot air grill having an L-shaped base comprising a vertical portion and a horizontal portion. An air heating assembly mounted on the vertical portion of the base in a position overhanging the horizontal portion comprises a heating coil and a fan on the shaft of a motor housed in the vertical portion of the base. The vertical base portion also houses switching and control components for the motor and the heating coil. A preferably transparent grill chamber casing for containing the food to be grilled sits on the horizontal portion of the base and has a lateral opening which receives the air heating assembly that is mounted on the vertical base portion. The grill chamber casing is positioned on the base by means of interfitting portions of the casing and the horizontal portion of the base and by a fixed portion of the vertical base portion that is received in the lateral opening of the casing. The grill chamber casing is thereby securely positioned on the base without the need of any attachments and can hence be removed from the base merely by lifting it off.

The vertical base portion is provided with means for hanging the hot air grill on a wall or other vertical surface, for example by means of a screw received in a keyhole shaped aperture in an upper portion of the base while the horizontal base portion has a flat bottom so that is is adapted to sit on a table, counter or other horizontal surface. Thus a hot air grill in accordance with the present invention can be hung on a wall or set on a table as the user desires. Moreover, the vertical base portion and horizontal base portion are preferably connected with one another by a hinged joint so that the horizontal base portion—when the grill chamber casing is removed—can be folded up against the vertical base portion so as to cover the hot air assembly. The base portion is of such shape and size that when folded up it can be received in the grill chamber casing, thereby providing compactness for transport or storage.

The heating coil of the hot air assembly is provided with contact portions which plug into jacks provided in the vertical base portion so that the heating coil can be removed for cleaning merely by unplugging it from the vertical base portion. Moreover, the hot air assembly further includes a cover for the fan. The cover has a central opening and is also open at its periphery so that air from the interior of the grill chamber casing is drawn in through the central opening and discharged back into the grill chamber casing from the periphery of the fan after passing over the heating coil. The fan cover is fixed to the heating coil so as to be removable therewith as a unit. Contacts of the jacks for the heating coil include contacts which serve as a disconnect switch in the motor circuit so that the motor cannot run to drive the fan when the cover together with the heating coil is removed. The fan is also easily and quickly removable from the motor shaft without the need of tools so that the heating coil, cover and fan can easily be cleaned for example by being put in a commercial dishwasher. Back of the fan there is a fixed cover having a smooth surface which can be easily be cleaned when the fan is removed. Thus all parts which are subjected to the air circulating in the grill chamber casing and thus subject to deposit of grease or other material from the food being grilled can be kept clean and sanitary. By preventing the build up of deposits on the heating coil, efficiency of the hot air assembly is maintained.

In a compartment between the front wall of the vertical base portion and the fixed cover back of the heater fan there is preferably provided a cooling fan which is mounted on the motor shaft between the motor and the heater fan. The front wall of the vertical base portion is provided with a central opening and openings are also provided at the periphery of the compartment housing the cooling fan so that the fan draws in air through the central opening and discharges it through the peripheral openings. The motor and other components in the vertical base portion are thereby protected from the heat of the hot air assembly. Moreover, openings are preferably also provided in the rear wall of the vertical base portion back of the motor so that the cooling fan draws air in over the motor and thereby cools it.

Such apparatus can be made very compact and is neat in appearance and out of the way in unused condition when wall mounted since the grill chamber casing can be removed and stored elsewhere, for example in a cupboard. On the other hand, it can well be used as table top apparatus in which event the table surface is protected by the horizontal base portion from the heat of the grill chamber casing. All parts of the apparatus which are subjected to the hot air flow and hence subject to the deposits of grease or other substance can be removed with little manipulation and cleaned thoroughly without problems, for example by being put in a dishwashing machine. Any remaining parts, for example a fixed cover back of the fan and a temperature sensor, can be wiped off without any problem as they are flat and are readily accessible after removal of the hot air assembly. The fixed cover back of the heating assembly and the cool air flow produced by the cooling fan mounted on the motor shaft between the hot air assembly and the motor and separated from the heater fan by the fixed cover, protect the vertical base portion and the motor and other components in the base from the heat of the hot air assembly.

As the contact portions of the heating coil which are plugged into jacks in the base are horizontal there is no danger of the hot air assembly falling out of the receptacle in the base into which it is plugged so that the hot air assembly is secured in a simple manner. The formation of the heating element with electrical contact portions which plug into suitable recessed jacks in the base represent in this combination an especially favorable solution for the removal, construction and the electrical connection of the heating element. Through the provision of a grill chamber casing support which can be brought into and removed from a horizontal position there is, on the other hand, a simple support for the grill chamber casing in position for use and removal therefrom without the loosening of fasteners and, on the other hand, a simple removal of the projecting support are made possible so that the remaining apparatus after removal of the support is very small.

The support can be brought into its horizontal supporting position, for example through insertion of the support in the vertical base portion or insertion of the vertical base portion into the support. It is particularly advantageous however for both base portions to be hingedly connected with one another because both portions are thereby permanently connected and can easily be brought into one or the other position and when folded together occupy but little room and cannot be lost from one another.

One base portion can advantageously be formed as a shell which fits over and protects the connecting means, switching means, control means, drive means and hot air assembly of the vertical base portion when in folded condition. Thus in the non-use position, it forms a closed housing which covers the hot air assembly and protects it from dirt.

The grill chamber casing can be supported and held against undesired movement in different ways when in use. An especially simple and advantageous means for securing the grill chamber casing in use is a construction in which the grill chamber casing resting freely on the horizontal base portion is secured against turning and against being drawn away from the hot air assembly by a portion on the vertical base portion which engages the edge of the opening in the side of the grill chamber casing which receives the hot air assembly and by interfitting portions of the horizontal base portion and the bottom of the grill chamber casing. Then it is not necessary to move or apply any other construction part in order to hold the grill chamber casing securely in proper position. Special support parts can be provided for supporting the grill chamber casing. However, these and the incident production cost can be avoided when the upper edge of the shell which can be brought into horizontal position forms the support for the grill chamber casing when in this position. On this shell there can advantageously be provided rest means in the form of at least one holding formation which fits and cooperates with a holding formation of the grill chamber casing. This method avoids a deepening in the grill chamber casing which could be cleaned only with difficulty although basically the support could be formed in reverse manner, namely by a depression in the grill chamber casing and a corresponding recess in the horizontal part of the base, especially if the recess is large.

An advantageous feature of the invention is that the base is formed in two parts, namely a vertical part on which the hot air assembly is mounted and which contains the motor for driving the fan of the hot air assembly and switching and control components, and a horizontal portion on which the grill chamber casing rests and by which it is supported in use, and that when the hot air grill is not in use and the grill chamber casing is removed from the base, the two parts of the base can be folded up so as to be very compact and the hot air assembly is covered and protected by the horizontal base portion. In the event the hot air grill is mounted on a wall, the base when folded up can be left on the wall where it is very neat and inconspicuous. On the other hand, the base when folded up is so compact that it can be placed inside the grill chamber casing for transport or storage.

As is known per se, at least the upper portion of the grill chamber casing is transparent so that the food can be observed while being grilled. In one embodiment of the present invention, the grill chamber casing is divided on a central horizontal plane so as to provide two deeply dished halves which are placed on one another with the upper half inverted so as to provide a lid or cover. Advantageously the two halves are identical with one another and are formed of heat and shock resistant glass. Between the two halves there is a strip or band, for example of metal or heat resistant plastic, which forms a seal and also maintains the two halves in register with one another.

In another embodiment of the invention the grill chamber casing is made in three parts comprising upper and lower shells and a sleeve portion between the two shells. The shells can be conventional transparent containers, in particular formed of heat and shock resistant glass. The sleeve can, if desired, also be transparent or may be formed of sheet metal. This construction avoids the high cost of the special deep glass shells needed for a large hot air roasting chamber. Also the replacement cost of any broken parts is reduced.

One or more gratings can be provided according to the form of the grill chamber and the nature of the food that is to be grilled or roasted. Such gratings can in usual manner be provided with supporting feet. In the case of a grill chamber casing comprising two deeply dished halves with a ceiling band between the two halves, the grating can advantageously be supported by the ceiling band.

In order to improve the hot air circulation, the hot air assembly can be formed with a sheet metal cover which is positioned in front of the heater fan and provided with a central opening whereby air from the interior of the grill chamber casing is drawn in through the central opening and discharged at the periphery of the fan after passing over the heating coil. The cover further protects users of the apparatus from injury by the fan. The cover can be separate so as to be removable from the heating element. When, however, the heating element and its cover are secured fast to one another so as to form a single unit, there are fewer parts to be removed for cleaning and, moreover, direct contact with the hot heating coil is avoided and above all contact with the heater fan upon removal of the heating coil is avoided.

The heating fan can be movably secured on the shaft of the fan motor in many ways. For example the shaft of the driving motor can be formed with a profile on which the fan rotor is slipped and held axially by means of a screw or the like. However, removal of the fan rotor from the shaft is made especially simple by the use of a snap coupling between the fan rotor and the shaft of the driving motor.

When in the vicinity of the jacks into which contact portions of the heating element are plugged, there is provided an additional spring contact constituting a disconnect switch for the fan motor so that the motor is disconnected when the heating element is unplugged, the danger that a person's fingers might be injured when the heating coil and protective cover is removed is effectively avoided.

Control components provided in the vertical base portion may comprise a time switch and a temperature regulator. When a temperature sensor is provided in position between the fan and the heating element, the temperature in the hot air grill chamber can be controlled within a small range.

BRIEF DESCRIPTION OF DRAWINGS

The nature, objects and advantages of the invention will be more fully understood from the following description of preferred embodiments as shown by way of example in the drawings in which:

FIG. 3 is a front view;

FIG. 4 is a back view of the grill chamber casing removed from the base, the right half of the casing being shown in section taken on the line 4—4 in FIGS. 1 and 2;

FIG. 7 is an enlarged vertical section through the vertical base portion and adjacent portion of the grill chamber casing approximately on the same line as FIG. 1 but with a portion offset to show a contact for the heating element;

FIG. 8 is a front view of the vertical base portion with portions broken away and with the horizontal base portion shown in section.

DESCRIPTION OF PREFERRED EMBODIMENTS

Figure 1:
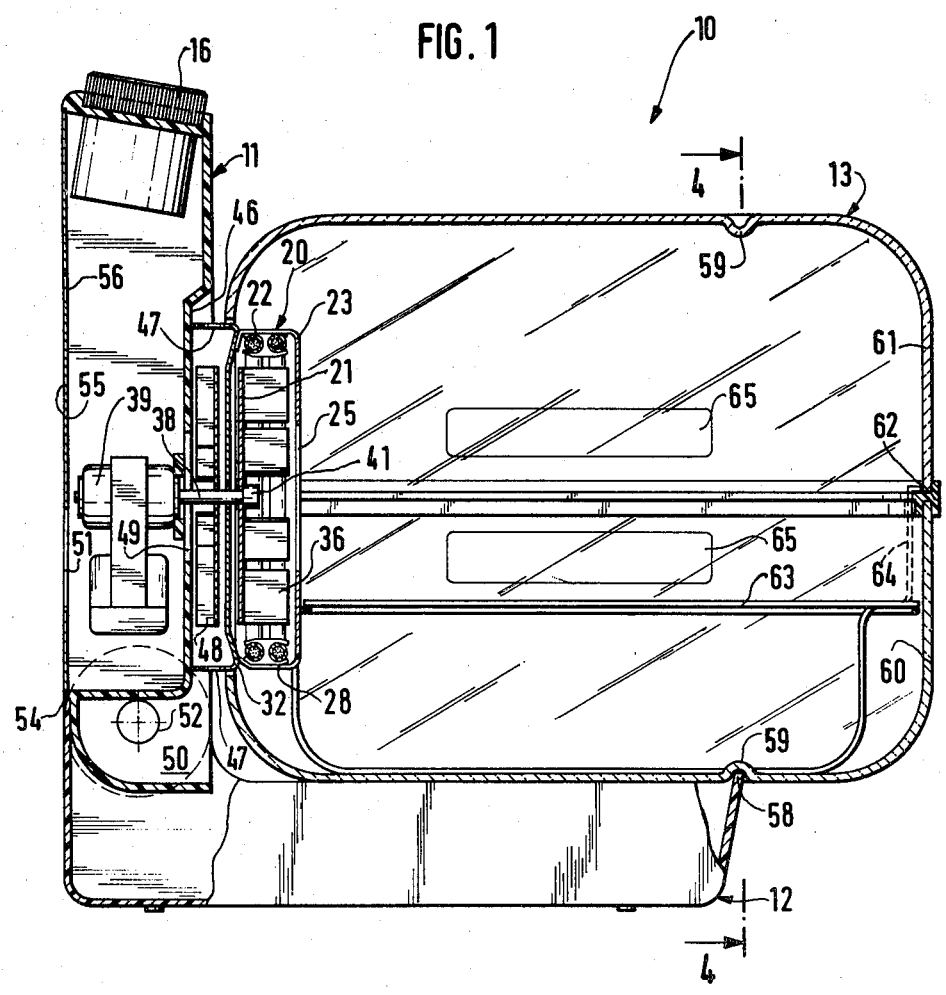
FIG. 1 is a vertical section taken approximately on the line 1—1 in FIGS. 2 and 3 through a hot air grill in accordance with the present invention, the horizontal portion of the base being shown only partially in section and certain details being omitted for the sake of clearness.
Figure 2:
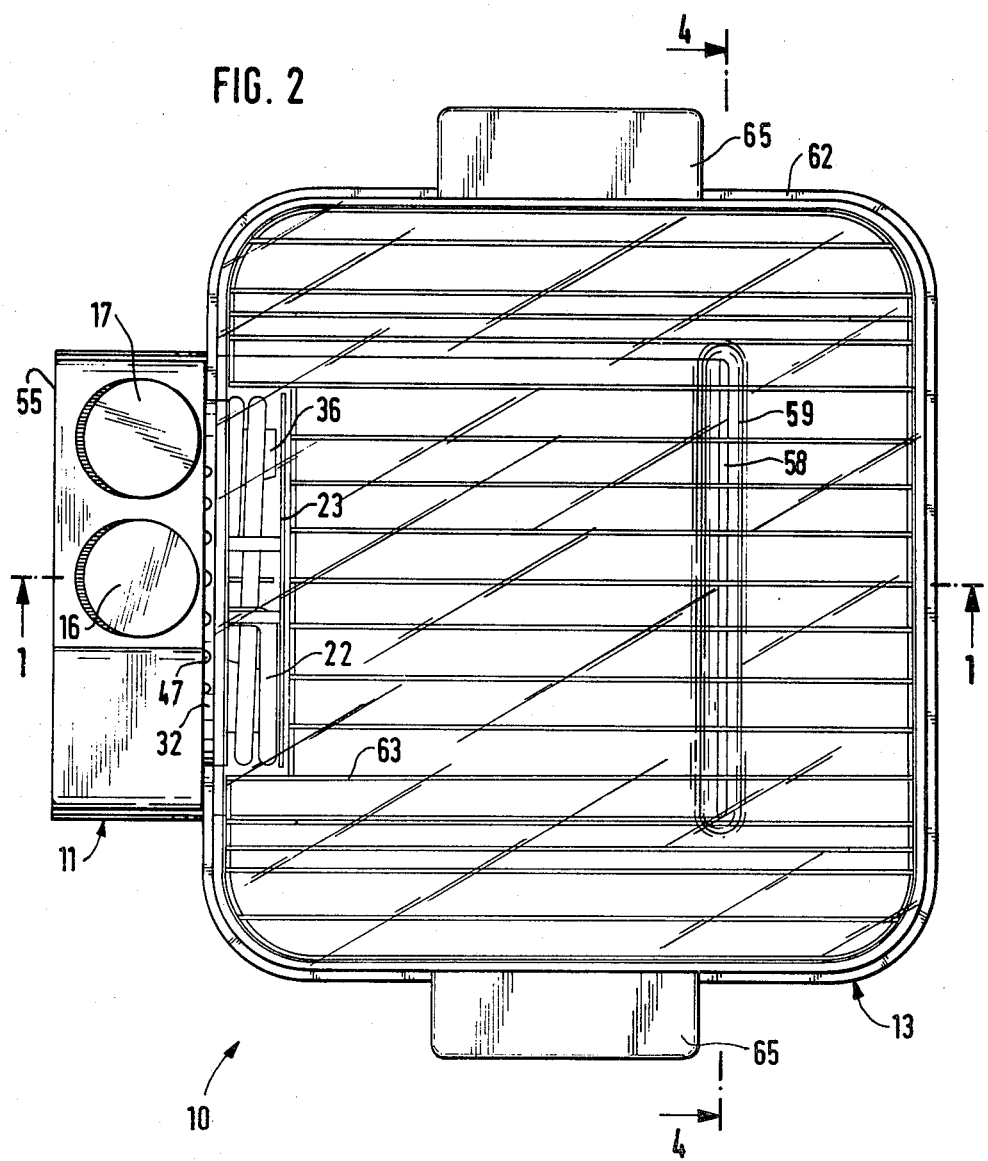
FIG. 2 is a plan view of the hot air grill shown in FIG. 1.

A preferred embodiment of a hot air grill in accordance with the present invention is shown in FIGS. 1-8. The hot air grill 10 comprises a vertical base portion 11, a horizontal base portion 12 and a grill chamber casing 13. The grill chamber casing sits on the horizontal base portion 12 and has in one side a circular opening to receive a hot air assembly 20 mounted on the vertical base portion 11. The hot air assembly 20 comprises a radial type fan 21, a helically wound heating coil 22 and a cover 23. The fan 21 is mounted on the horizontal shaft 38 of a motor 39 mounted in the vertical base portion 11 between a front wall 47 and a removable rear wall 55. The cover 23 is formed as a sheet metal disc having a central opening 25 across which widely spaced cross bars 26 extend. At its lower edge 27 the cover 23 has a clip portion 28 which is bent inwardly at approximately 90° to the plane of the cover and has an end bent to form a hook portion 29 adapted to engage in a cut-out 30 provided in a lower portion of a further cover 32 which is fast on the vertical base portion. The cover 23 is fixedly connected to the heating element 22 and can only be removed from the vertical base portion 11 together with the heating element as a unit.

In order to mount the heating element 22 on the vertical base portion 11, ends of the heating coil are bent to form horizontal contact portions 33 which are perpendicular to the plane of the coil. The contact portions 33 are received in counter sunk jacks in the vertical base portion 11 comprising spring contacts 34 for supplying electric current to the heating element. The two contact portions 33 lie in a horizontal plane approximately tangential to the heating winding 22 and outside the circumference of the fan 21. The two contact portions 33 are located on opposite sides of a central vertical plane passing through the axis of the motor shaft 38 and thus together with the clip portion 28 at the lower edge of the cover 23 provide a secure three point support for the unit comprising the heating coil 22 and cover 23. With the construction shown, the heating element together with the cover 23 can be plugged into the vertical base portion and can be readily removed for cleaning. The heating element comprises an insulated resistance element inside of a metal sheath which is grounded by means of a spring contact 33a (FIG. 7) in the vertical base portion.

Moreover, the receptacles for the contact portions 33 of the heating element 22 comprise spring contacts 35 which are in the motor circuit and serve as disconnect switches so that when the heating element is unplugged, the motor is disconnected and cannot run. Hence the fan cannot be turned on when the heating element and cover 23 are removed.

The vertical base portion 11 also contains controls for the motor and heating element. These controls are shown as comprising a time switch 16 and a temperature selector 17 which is connected with a temperature sensor 18 (FIG. 8) mounted in the vicinity of the air heating assembly. As seen in the drawings, these controls are located in the upper portion of the vertical base portion where they are convenient to the user. To supply current to the motor and heating element, the vertical base portion is provided with an electric cord 15 which can be stored in a compartment 50 provided in the vertical base portion as illustrted in FIG. 8 when the hot air grill is not in use.

As shown in FIGS. 7 and 8 the radial type fan 21 comprises trapezoidal shape fan blades 36 stamped out of and bent up at 90° from a metal disc 21a. The fan rotor is nonrotatably secured on the shaft 38 of the motor 39 by a spring snap coupling 37. The disc portion 21a of the fan rotor is secured to a hub 41 which fits onto the flattened outer end portion of the shaft 38. One half of a clip-form spring wire 40 is inserted through a hole in the hub portion 41 of the fan 21 and lies against the flat side of the shaft 38 while the other half is received in a cut-out 43 in the hub 41 and lies in an annular groove 42 in the shaft. The annular groove 42 has the same diameter as the clip-form spring wire 40 and thereby secures the fan rotor against axial movement on the shaft. In order to free the spring snap coupling 37, it is necessary merely to engage the end portion 44 of the second half of the spring clip and spring it out slightly so as to disengage the clip from the annular groove 42. The fan rotor can thereupon be slipped off of the shaft 38. All parts of the air heating assembly 20 which come in contact with the hot air are formed of rust-free material and can be washed in a conventional dishwasher.

A dished cover 32 is fixed to the front wall 46 of the vertical base portion 11 and forms a compartment between the wall 46 and the fan 21. It has a central hole for passage of the motor shaft 38 and is provided in its peripheral portion with a plurality of cooling air holes 47. In the compartment between the cover 32 and the front wall 46 of the vertical base portion there is a radial type cooling fan 48 fixed on the shaft 38 of the motor 39. The front wall 46 of the vertical base portion 11 is provided with a central hole 49 around the motor shaft and the rear wall 55 is provided with slits 51 back of the motor 39. The cover 32 forms a partition between the heater fan 21 and the cooling fan 48. When the motor is running, the fan 48 draws in air through the slots 51 and opening 49 and discharges it through the radial openings 47 in the peripheral portion of the cover 32. The vertical base portion and the motor and controls therein are thereby protected from the heat of the air heating assembly. Moreover, the air drawn in through the slots 51 serves to cool the motor 39. The peripheral portion 45 of the cover 32 serves to center and hold the grill chamber casing 13.

Figure 6:
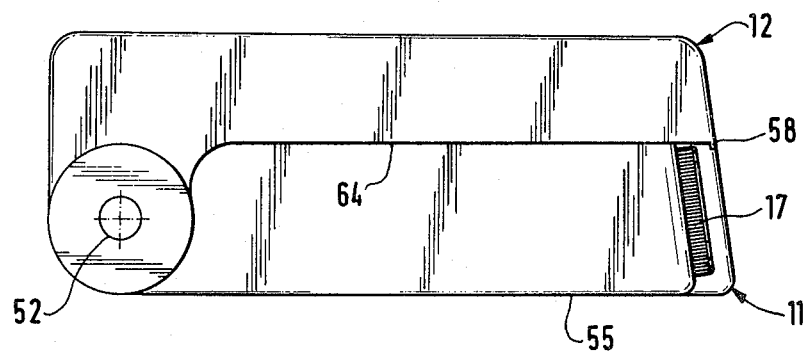
FIG. 6 is a side view of the folded-up base.

In the lower portion of the vertical base portion 11 on both sides of the compartment 50 for the electric cord 15, there are hinged joints 52 which connect the vertical base portion 11 with the horizontal base portion 12. This hinged connection permits the horizontal base portion 12 to pivot with respect to the vertical base portion 11 between a closed position as shown in FIG. 6 in which the horizontal base portion covers the front of the vertical base portion and receives the air heating assembly in a compartment in the horizontal base portion and an opened position in which the horizontal base portion is perpendicular to the vertical base portion as shown in FIG. 1. In the opened position, a rear edge portion of the horizontal base portion abuts a shoulder 54 in the rear wall 55 of the vertical base portion. In an upper portion of the rear wall 55 there is provided a keyhole shaped opening 56 whereby the vertical base portion can be mounted on a vertical surface such as a wall by means of a screw received in the opening 56. When the vertical base portion 11 is thus mounted, for example on a wall, the interengaging portions of the horizontal base portion and vertical base portion together with the hinged joints 52 support the horizontal base portion in a horizontal position as shown in FIG. 1 and thereby support the grill chamber casing 13 which rests on the horizontal base portion.

The horizontal base portion 12 is rectangular dish shape and has a peripheral wall which corresponds in shape and size to the vertical base portion 11 so that when the horizontal base portion is folded to closed position as shown in FIG. 6, it covers and protects the hot air assembly 20. At the end opposite the hinge joints 52, the horizontal base portion 12 has an upstanding edge 58 which is received in and corresponds to a retaining groove 59 formed in the bottom of the grill chamber casing 13. The grill chamber casing is thereby properly positioned on the horizontal base portion 12 so as to receive the hot air assembly 20 in an opening 66 provided in the back side of the casing. The edge 67 of the opening 66 engages the peripheral portion 47 of the fixed cover 32 on the vertical base portion 11 so as to center the grill chamber casing properly with respect to the hot air assembly 20.

The grill chamber casing 13 is divided horizontally on a plane in line with the axis of the motor shaft 38 and consists of two identical deep dish portions 60 and 61 which are preferably formed of transparent material and in particular of heat and shock resistant glass. The two halves 60, 61 of the casing are assembled one over the other with the upper half inverted as illustrated in FIG. 4. Between the two halves there is a sealing band 62 formed for example of metal or heat resistant plastic. The sealing band 62 has a channel which receives the upper edge of the lower casing half 60 on which the band is fixed and an up-standing peripheral shoulder which receives the lower edge of the upper casing half 61 so as to keep the two halves of the casing in register.

In the lower part 60 of the grill chamber casing there is provided a grating 63 which may be supported from the bottom of the casing as shown in solid lines or may be suspended from the sealing ring 62 as indicated at 64 in dotted lines. Gratings may be provided at different levels as desired depending on the food-stuff that is being prepared. At both sides of each of the casing portions 60 and 61 of the grill chamber casing 13 there are provided insulated handles 65. The handles are preferably formed of heat resistant plastic and are suitably secured to the casing parts, for example by screws. In the side facing the vertical base portion 11 each of the grill chamber casing parts 60 and 61 is provided with a semicircular opening so that when the two halves of the casing are assembled as illustrated in FIG. 4, the two semicircular openings together form a circular opening 66 for receiving the hot air assembly 20. Through engagement of the edge 67 of the opening 66 with the fixed cover 32 on the vertical base portion 11 and engagement of the groove 59 in the bottom of the lower casing part with the up-standing edge portion 58 of the horizontal base portion 12, the grill chamber casing is precisely and securely positioned on the base. The grill chamber casing merely sits on the base and can hence be readily removed since no fasteners or other securing means are required.

Figure 5:
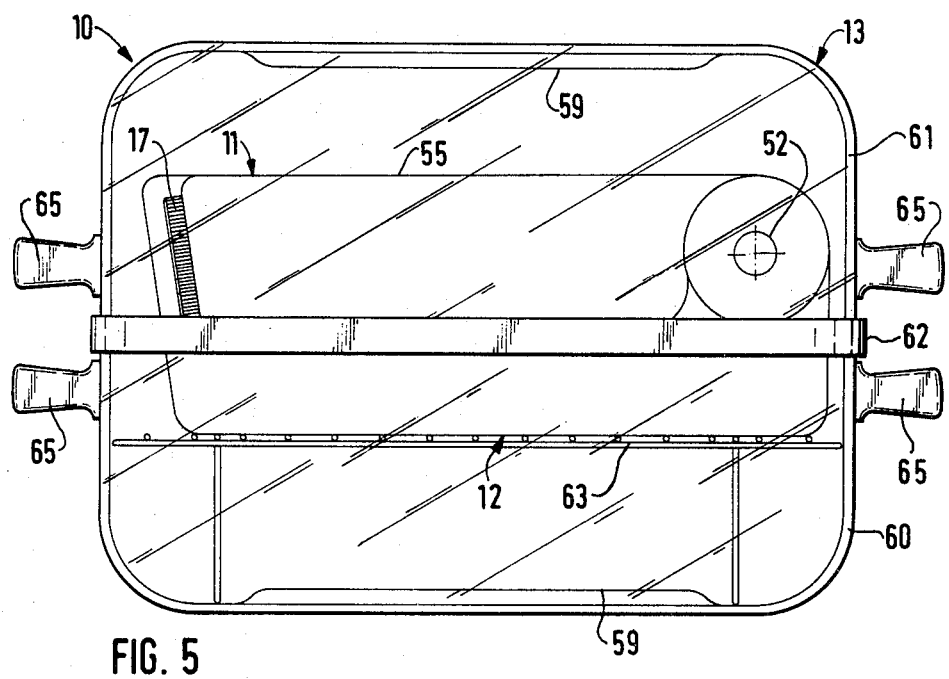
FIG. 5 is a front view of the grill chamber casing with the base folded up and stored inside the casing.

As seen from FIGS. 5 and 6, the vertical base portion 11 and horizontal base portion 12 are of such size and shape that when they are folded to closed position, the entire base can be placed inside the grill chamber casing 13 where it rests on the grating 63. This is convenient for transporting the hot air grill or for storing the hot air grill when not in use. The assembly is so compact that very little space is required. For example the hot air grill may have a height of 33 cm, a width of 41 cm and a depth of 37 cm.

When the hot air grill 10 is to be used, it is necessary merely to lift the upper shell 61 of the grill chamber casing 13 from the lower shell 60 by means of the insulated handles 65 and remove the folded-up base. The base is then unfolded until the rear edge of the horizontal base portion 12 engages the shoulder 54 of the vertical base portion 11 and the base is thereupon hung on a wall by means of the hanging opening 56 or placed on a table or other horizontal surface. After removal of the electric cord 15 from the storage room 50, the grill chamber casing 13 is placed on the horizontal base portion 12 with the groove 59 in the bottom of the casing in engagement with the up-standing edge portion 58 of the base. The time switch 16 permits setting a selected cooking time and the temperature selector 17 in conjunction with the temperature sensor 18 positioned in the air stream between the fan and heating element 22 permits setting the desired temperature which is thereupon held constant within a narrow control range. During the grilling process, the fan 21 circulates the air in the grill chamber casing, the air being drawn in from the interior of the casing through the opening 25 in the cover 23 and discharged back into the casing through the opening at the periphery of the cover 23 after passing over the heating coil 22. By reason of this air circulation, uniform and fast heating of the grill or bake goods is obtained. The cooling fan 48 in the compartment between the fixed cover 32 and the front wall of the vertical base portion 11 serves to protect parts such as the motor 39 in the vertical base portion from the heat of the hot air assembly 20.

Upon expiration of the time set by the time switch 16, the heating coil and motor are automatically turned off. The upper part 61 of the grill chamber casing 13 can then be lifted off by means of the insulated handles 65 and the grilled food-stuff can be removed from the grating 63. If desired, the lower part 61 of the grill chamber casing 13 can be lifted off by means of the insulated handles 65 and used as a serving dish for the prepared food. When the grill chamber casing has been removed and the hot air assembly 20 has sufficiently cooled, the heating coil 22 together with the affixed cover 23 can be removed from the vertical base portion 11. This is accomplished merely be first unhooking the bent portion 29 of the clip portion 28 of the cover 23 from the cut-out 30 in the fixed cover 32 and then pulling forwardly on the coil 22 and cover 23 to withdraw the contact portions 33 of the coil from the contact receptacle in the vertical base portion 11. When the contact portions 33 of the heating coil 22 are unplugged, the disconnect switch comprising contacts 35 (FIG. 7) is opened so that the motor 39 is disconnected. Hence there is no danger of fingers being injured by the fan 21 when the cover 23 is removed. Through these contacts 35 the motor 34 is connected in parallel with the heating element 22. After the heating element 22 with the cover 23 is removed, the fan 21 can easily be removed from the shaft 38 merely by pressing outwardly on the end 44 of the clip shape spring wire 40 so as to disengage the wire from the annular groove 42. The fan 21 and heating coil 22 together with the cover 23 can thus be readily cleaned, for example by putting them in a conventional dishwashing machine. The side of the fixed cover 32 which faces the hot air assembly 20 is flat and hence can be easily cleaned.

Figure 9:
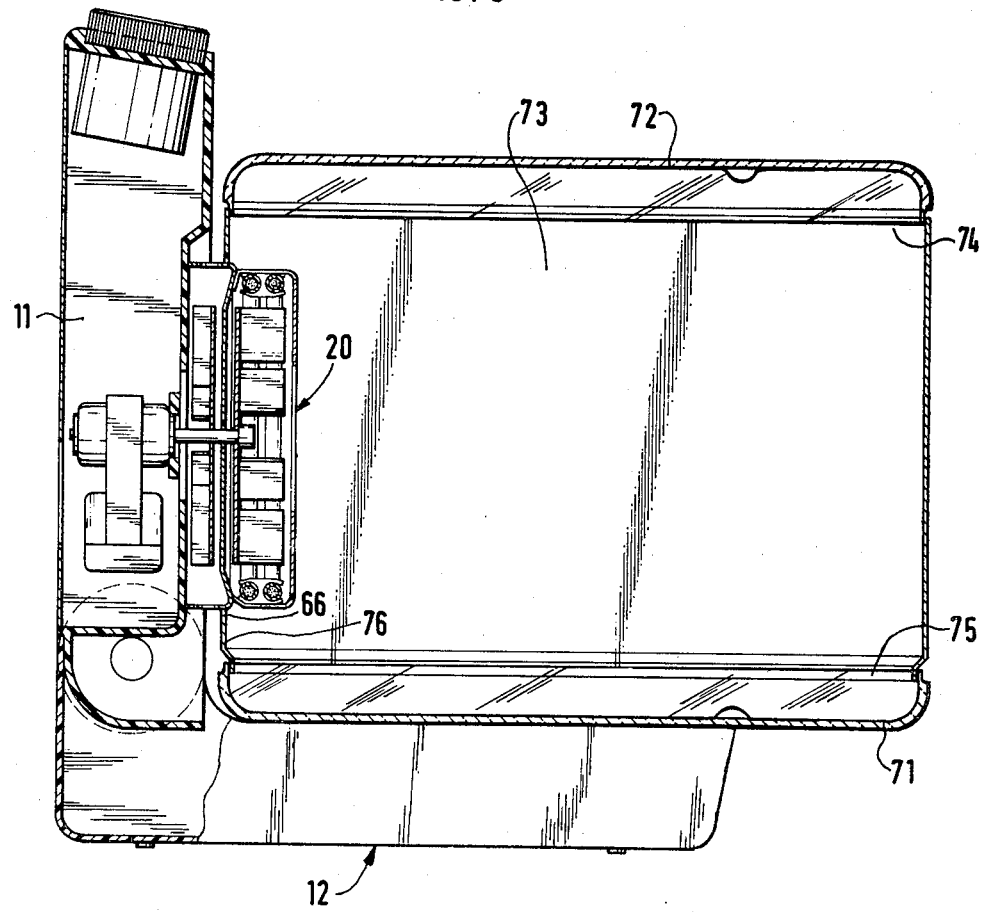
FIG. 9 is a view essentially like FIG. 1 but showing a variation of the grill chamber casing.

In FIG. 9 there is shown a possible variant of the grill chamber casing. The base portions 11 and 12 with the hot air assembly 20 are the same as in the embodiment illustrated in FIGS. 1–8. However, the grill chamber casing shown in FIG. 9 comprises a lower shell 71, an upper shell 72 and a sleeve portion 73 which has two openings 74 and 75 the shape of which corresponds exactly to the edges of the shells 71 and 72. The shells 71 and 72 can commercially be transparent glass shells molded of heat and shock resistant glass. The shells 71 and 72 are preferably identical but at least the upper shell is transparent. The sleeve 73 can also be formed of heat resistant transparent material or of metal, in particular sheet metal. In the rear wall 76 there is provided a circular opening 66 to receive the hot air assembly 20. The mode of use of the hot air grill shown in FIG. 9 is the same as described above. All three parts of the grill chamber casing can be taken apart and easily cleaned, for example in a conventional dishwashing machine. They are easily produced by conventional manufacturing methods. The edges of the upper and lower openings of the sleeve portion 73 can be slightly different as shown so that the lower edge fits inside the edge of the lower shell 71 while the upper edge fits outside the edge of the upper shell 72.

As many modifications and variations are possible, the invention is in no way limited to the illustrated embodiments. Thus for example instead of the illustrated glass shells of the embodiment shown in FIG. 9, other pots, pans or the like can be used. Instead of the two base portions being hingedly connected, a plug-in connection can be used or the base can be of unitary construction if the compactness of the folded base is relinquished. Also the base with the removable hot air assembly can be used with other forms of grill chamber casings and the outer form of the base and grill chamber casing can be varied as desired. In addition to cooking foods, the hot air grill in accordance with the invention can be used for other purposes, for example thawing frozen food. The temperature and time can readily be set according to the purpose for which the grill is used.

What is claimed is:

1. A portable hot air grill comprising a two-part base comprising a horizontal base portion and a vertical base portion foldably interconnected with one another, an electric motor mounted on said vertical base portion and having a horizontal shaft, a heating assembly projecting from said vertical base portion over said horizontal base portion and comprising a heater fan mounted on said motor shaft and an electric heating element in position to heat air blown by said fan, and a removable casing for receiving food stuff to be cooked, said horizontal base portion including means for removably supporting said casing thereon, and said casing being supported by removably resting by gravity on said horizontal base portion and having front, back, side, top and bottom walls of which at least said top wall is at least in part transparent, said back wall being unitary with said front and side walls and having an opening of a size and shape to receive said heating assembly when said casing rests on said horizontal base portion, said casing comprising at least two complementary, separable superposed parts which meet in a horizontal plane and have interfitting rim portions positioning said parts relative to one another when assembled one over another, said horizontal base portion and said casing having interfitting portions for positioning said casing in predetermined position on said horizontal base portion to receive said heating assembly through said opening said base being of a size to be received in said casing when in a folded-up condition.

2. A hot air grill accordng to claim 1, in which the connection between said horizontal base portion and said vertical base portion is a hinge connection and in which said horizontal base portion has an upwardly opening compartment and is foldable by said hinged connection up against said vertical base portion, said heating assembly being received in said compartment of said horizontal base portion when in folded-up position.

3. A hot air grill according to claim 2, in which an electric cord is provided for supplying current to said motor and heating assembly, and in which said vertical base portion has a compartment for receiving said cord.

4. A hot air grill according to claim 2, in which said vertical base portion is provided with means for hanging said vertical base portion on a vertical surface such as a wall, and in which said vertical base portion and horizontal base portion have interengaging abutting portions which in cooperation with said hinged connection between said base portions, support said horizontal base portion in horizontal position and thereby support said casing.

5. A hot air grill according to claim 1, in which said interfitting portions for positioning said casing on said horizontal base portion comprise a groove in a bottom portion of said casing and an upstanding edge portion of said horizontal base portion received in said groove.

6. A hot air grill according to claim 1, in which said casing comprises two like deeply dished transparent halves which join in a horizontal plane in line with the axis of said motor shaft when said casing is in position on said horizontal base portion, each half of said casing having in one side a semicircular opening, said semicircular openings together forming a circular opening to receive said heating assembly when said two casing halves are assembled one over the other with the upper half inverted.

7. A hot air grill according to claim 1, further comprising a sealing band which fits between superposed edges of said casing halves and forms a joint between them.

8. A hot air grill according to claim 1, in which said fan is a radial type fan and in which said heating element is a heating coil which surrounds said fan.

9. A hot air grill according to claim 8, in which said heating assembly further comprises a cover for said fan and heating coil, said cover having a central opening and a peripheral opening, whereby when said fan is in operation, air is drawn in from the interior of said casing through said central opening and is discharged back into the interior of said casing through said peripheral opening after passing over said heating coil.

10. A hot air grill according to claim 9, in which said heating coil is removable without the use of tools from said vertical base portion, and in which said cover is fixed to said heating coil is removable therwith as a unit from said vertical base portion.

11. A hot air grill according to claim 8, in which said heating coil has contact portions which extend into said vertical base portion perpendicular to the plane of said heating coil, and in which an electrical receptacle is mounted in said vertical base portion in position to receive said contact portions of said coil, whereby said heating coil is assembled on said vertical base portion by being plugged into said receptacle in said vertical base portion and can be removed by being unplugged therefrom.

12. A hot air grill according to claim 11, in which said heating assembly further comprises a cover for said fan and heating coil, said cover being fixed to said heating coil and being removable therewith as a unit from said vertical base portion.

13. A hot air grill according to claim 11, comprising means including a disconnect switch for supplying current to said motor, said disconnect switch being operable by said contact portions of said heating coil to disconnect said motor from the current supply when said heating coil is unplugged.

14. A hot air grill according to claim 8, in which said heating coil comprises an insulated resistance in a metal sheath, and in which a grounded electrical contact in said vertical base portion is positioned to engage said sheath when said heating coil is plugged into said receptacle.

15. A hot air grill according to claim 1, further comprising controls for said motor and heating assembly, said controls being mounted at the top of said vertical base portion and comprising a time switch and a temperature selecting control.

16. A hot air grill according to claim 15, in which said temperature selecting control includes a temperature sensing element mounted near said heating assembly.

17. A hot air grill according to claim 1, further comprising a cooling fan mounted on said motor shaft between said heater fan and the motor, and a housing for said cooling fan including a front wall of said vertical base portion and a partition between said cooling fan and said heater fan, said cooling fan housing having peripheral openings and a central opening in said wall, whereby cooling air is drawn in by said cooling fan through said central opening and discharged through said peripheral openings so as to oppose heat transfer from said heating assembly to said vertical base portion and the motor therein.

18. A hot air grill according to claim 17, in which said vertical base portion has a rear wall spaced from said front wall, said motor being mounted between said front and rear walls, and in which openings are provided in said rear wall back of said motor, whereby air drawn by said cooling fan through said openings in the rear wall and said central opening in the front wall of said vertical base portion flows over and thereby cools said motor.

19. A hot air grill comprising a two part base comprising a horizontal base portion and a hollow vertical base portion projecting up from the horizontal base portion and having a compartment defined by a front wall, a vertical rear wall spaced from said front wall and a peripheral wall vertical, an electric motor mounted in said compartment of said base portion between said front and rear walls, said motor having a horizontal shaft extending forwardly through said front wall, a heating assembly comprising a heater fan mounted on said motor shaft forwardly of said front wall of said base portion and an associated electric heating element in position to heat air blown by said fan, a removable casing for receiving food-stuff to be cooked, said casing being at least in part transparent and having an opening to receive said heating assembly, said casing being removeably supported in a horizontal position on said horizontal base portion with said heating assembly received in said opening, a radial type cooling fan mounted on said motor shaft forwardly of said front wall and between said heater fan and said front wall, and a housing for said cooling fan comprising said front wall of said base portion and a vertical partition between said cooling fan and said heater fan, said partition being imperforate except for an opening for said shaft, said cooling fan housing having peripheral openings opening to the atmosphere and a central opening in said front wall opening into said compartment, whereby cooling air is drawn in by said cooling fan over said motor and through said central opening and is discharged to the atmosphere through said peripheral openings so as to oppose heat transfer from said heating assembly to said vertical base portion and the motor therein.

20. A hot air grill according to claim 19, in which openings are provided in said rear wall of said base portion back of said motor, whereby air drawn by said cooling fan through said openings in the rear wall and and central opening in the front wall of said base portion flows over and thereby cools said motor.

21. A hot air grill according to claim 19, in which said heater fan is a radial type fan and said heating element is a heating coil surrounding said heater fan, said heating assembly further comprising a cover for said heater fan and heating coil spaced from said partition, said cover having a central opening and peripheral openings whereby, when said heater fan is in operation, air is drawn in from the interior of said casing through said central opening in said cover and is discharged back into the interior of said casing through said peripheral openings after passing over said heating coil.

22. A hot air grill according to claim 21, in which said heating coil has contact portions which extend into said base portion perpendicular to the plane of said heating coil, and in which an electrical receptacle is mounted in said base portion in position to receive said contact portions of said heating coil whereby said heating coil is assembled on said base portion by being plugged into said receptacle and can be unplugged for removal from said base portion.

23. A hot air grill according to claim 22, in which said cover for said heater fan and heating coil is fixed to said heating coil for removal with said coil as a unit from said base portion.

24. A hot air grill comprising a two-part base comprising a hollow vertical base portion and a horizontal base portion having an upwardly-opening compartment, driving means housed in said vertical base portion, a hot air assembly mounted on said vertical base portion and comprising a heating element and a fan drive by said driving means, and a grill chamber casing comprising complimentary separable, superposed parts adapted removably to sit on said horizontal base portion and having an opening to receive said hot air assembly, said horizontal and vertical base portions being hingedly interconnected to permit folding one against the other with said hot air assembly on said vertical base portion received in said compartment of said lower base portion, said base being of a size to be accommodated in said grill chamber casing in folded condition.

25. A hot air grill according to claim 24, in which said switching and control means for said driving means and said hot air assembly are housed in said vertical base portion.

* * * * *